UNITED STATES PATENT OFFICE.

CANTELLA-DELL McDOWELL, OF PONTIAC, MICHIGAN.

GUNPOWDER AND PROCESS OF MAKING THE SAME.

1,083,371.     Specification of Letters Patent.     Patented Jan. 6, 1914.

No Drawing.     Application filed April 12, 1913. Serial No. 760,730.

*To all whom it may concern:*

Be it known that I, CANTELLA DELL MC-DOWELL, a citizen of the United States, residing at Pontiac, in the county of Oakland and State of Michigan, have invented certain new and useful Improvements in Gunpowder and Processes of Making the Same, of which the following is a specification.

My invention relates to explosives and has particular reference to gunpowder and the process of making the same.

An important object of this invention is to produce gunpowder having a great explosive force or strength and which is safe to use in ammunition.

The composition of my explosive or gunpowder preferably consists of the following ingredients combined preferably in substantially the proportions stated, to wit: potassium chlorate, eight ounces; sugar, preferably granulated sugar, seven ounces; glycerin one drahm; and water, two drahms.

In the practice of my process of making the explosive or gunpowder, I place the sugar, glycerin and water, preferably in the proportions stated, in a suitable receptacle and heat the same while being stirred, until the mass boils. By this time the sugar is completely dissolved. No further heating of the mass is necessary. The potassium chlorate is then introduced into the mass and the same is thoroughly stirred. The final mass or product is passed or bolted through a sieve or screen of a suitable gage to give the proper grain to the resulting powder. By the time the mass has been passed through the sieve the same is practically dry, at least sufficiently dry so that the grains of the same will retain their individuality.

It is to be understood that the stated proportions of the ingredients are to be taken as a preferred example of the invention, and that such proportions may be widely varied with some degree of success and without departing from the spirit of the invention or the scope of the subjoined claims.

Having described my invention, I claim:

1. An explosive composition comprising substantially eight ounces of potassium chlorate, seven ounces of granulated sugar, one drahm of glycerin and two drahms of water.

2. The process of producing an explosive composition, which consists in dissolving sugar in a solution of glycerin and water by heating the solution until it boils, and subsequently introducing potassium chlorate into the mass thus obtained while heated and below the boiling point and thoroughly stirring the same.

3. The process of producing an explosive composition, which consists in adding sugar to a solution of glycerin and water, heating the mass until it boils and dissolving the sugar in the heated solution by stirring it, adding potassium chlorate to the mass thus obtained while the mass is heated and at a temperature below the boiling point and thoroughly stirring the same until the potassium chlorate is dissolved, and passing the final product through a sieve, for changing the same into a granular mass.

In testimony whereof I affix my signature in presence of two witnesses.

CANTELLA DELL McDOWELL.

Witnesses:
JOHN R. WILLIS,
AL. P. BRANNEN.